United States Patent
Kalyanaraman et al.

(10) Patent No.: US 9,925,916 B2
(45) Date of Patent: Mar. 27, 2018

(54) LINEAR PROJECTION-BASED NAVIGATION

(71) Applicant: International Business Machines Corporation, Armonk, NY (US)

(72) Inventors: Rajesh Kalyanaraman, Bangalore (IN); Senthil K. Venkatesan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/407,022

(22) Filed: Jan. 16, 2017

(65) Prior Publication Data

US 2017/0120807 A1     May 4, 2017

Related U.S. Application Data

(63) Continuation of application No. 14/674,415, filed on Mar. 31, 2015, now Pat. No. 9,593,959.

(51) Int. Cl.
    *G01C 21/34*     (2006.01)
    *G01C 21/36*     (2006.01)
    *B60Q 1/34*     (2006.01)

(52) U.S. Cl.
    CPC ......... *B60Q 1/346* (2013.01); *G01C 21/3644* (2013.01); *G01C 21/3647* (2013.01); *G01C 21/3632* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,712,632 A * | 1/1998 | Nishimura | ......... | G01C 21/3492 340/905 |
| 5,948,040 A * | 9/1999 | DeLorme | ............... | G01C 21/36 340/990 |
| 6,119,065 A * | 9/2000 | Shimada | ................ | G01C 21/20 340/944 |
| 6,259,990 B1* | 7/2001 | Shojima | ................ | G01C 21/20 340/4.1 |
| 6,330,453 B1* | 12/2001 | Suzuki | ................... | G01C 21/32 455/457 |

(Continued)

OTHER PUBLICATIONS

Duckham et al., ""Simplest" Paths: Automated Route Selection for Navigation", National Center for Geographic Information and Analysis, University of Maine, Orono, ME 04469, USA, pp. 1-18, provided in search report dated May 30, 2014, <http://www.geosensor.net/papers/sp8.pdf>.

(Continued)

*Primary Examiner* — Jonathan L Sample
(74) *Attorney, Agent, or Firm* — Gilbert Harmon, Jr.

(57) ABSTRACT

Embodiments of the present invention provide methods, systems, and computer program products for generating a linear projection of a route. In one embodiment, route information is received and parsed. Supplementary route data is received. A linear route is generated and provided to a user, the linear route comprising a straight line and one or more segments extending form the straight line, where ends of the straight line represent a starting point and destination of the linear route, and the one or more segments represent turns.

20 Claims, 11 Drawing Sheets

(56) References Cited

U.S. PATENT DOCUMENTS

| | | | | |
|---|---|---|---|---|
| 6,708,112 B1* | 3/2004 | Beesley | G01C 21/30 | 340/990 |
| 6,934,634 B1* | 8/2005 | Ge | G06F 17/30241 | 702/2 |
| 7,388,519 B1* | 6/2008 | Kreft | G06Q 10/047 | 340/995.1 |
| 7,395,152 B2* | 7/2008 | Watanabe | G01C 21/367 | 701/431 |
| 7,440,847 B2* | 10/2008 | Unuma | G01C 21/20 | 342/357.31 |
| 7,826,965 B2* | 11/2010 | Sadri | G01C 21/20 | 340/905 |
| 7,831,381 B2* | 11/2010 | Thota | G01C 21/3679 | 340/995.24 |
| 7,831,433 B1* | 11/2010 | Belvin | G10L 15/18 | 704/275 |
| 7,865,304 B2* | 1/2011 | Gretton | G01C 21/26 | 340/995.13 |
| 8,200,424 B2* | 6/2012 | Mitsugi | G01C 21/20 | 340/990 |
| 8,676,489 B2* | 3/2014 | Cheung | G01C 21/367 | 701/400 |
| 8,751,152 B2* | 6/2014 | Geelen | G01C 21/3655 | 340/995.19 |
| 2002/0087262 A1* | 7/2002 | Bullock | G01C 21/3446 | 701/421 |
| 2002/0091485 A1* | 7/2002 | Mikuriya | G01C 21/32 | 701/450 |
| 2002/0188399 A1* | 12/2002 | Odagawa | G01C 21/3461 | 701/533 |
| 2004/0008225 A1* | 1/2004 | Campbell | G01C 21/367 | 715/764 |
| 2005/0140524 A1* | 6/2005 | Kato | G08G 1/0968 | 340/995.13 |
| 2005/0149262 A1* | 7/2005 | Oikubo | G01C 21/3658 | 701/431 |
| 2005/0203698 A1* | 9/2005 | Lee | G01C 21/32 | 701/532 |
| 2006/0074547 A1* | 4/2006 | Kaufman | G01C 21/32 | 701/451 |
| 2006/0173614 A1* | 8/2006 | Nomura | G01C 21/32 | 701/425 |
| 2006/0265294 A1* | 11/2006 | de Sylva | G06Q 10/087 | 705/28 |
| 2006/0287815 A1* | 12/2006 | Gluck | G01C 21/3632 | 701/436 |
| 2008/0033633 A1* | 2/2008 | Akiyoshi | G01C 21/343 | 701/418 |
| 2009/0018767 A1* | 1/2009 | Gehring | B60W 40/072 | 701/533 |
| 2009/0192702 A1* | 7/2009 | Bourne | G01C 21/20 | 701/532 |
| 2010/0305847 A1* | 12/2010 | Gluck | G01C 21/3667 | 701/533 |
| 2010/0318291 A1* | 12/2010 | Gluck | G01C 21/367 | 701/532 |
| 2011/0103651 A1* | 5/2011 | Nowak | G01C 21/3647 | 382/106 |
| 2011/0161001 A1* | 6/2011 | Fink | G01C 21/3492 | 701/533 |
| 2012/0069131 A1* | 3/2012 | Abelow | G06Q 10/067 | 348/14.01 |
| 2013/0275899 A1* | 10/2013 | Schubert | G06F 3/0481 | 715/765 |
| 2013/0332077 A1* | 12/2013 | Khetan | G08G 1/0962 | 701/533 |
| 2014/0018996 A1* | 1/2014 | Mian | G05D 1/0212 | 701/26 |
| 2014/0107917 A1* | 4/2014 | Kazawa | G01C 21/3682 | 701/426 |
| 2014/0195155 A1* | 7/2014 | Aist | G01C 21/3484 | 701/533 |
| 2014/0358427 A1* | 12/2014 | Fuhrman | G01C 21/3602 | 701/452 |
| 2015/0241239 A1* | 8/2015 | van Dok | G01C 21/3664 | 701/538 |
| 2015/0247737 A1* | 9/2015 | van Dok | G01C 21/3691 | 701/431 |
| 2016/0123761 A1* | 5/2016 | Van Wieringen | G01C 21/3697 | 701/465 |

OTHER PUBLICATIONS

Gackstatter et al., "Fusion of Clothoid Segments for a More Accurate and Updated Prediction of the Road Geometry", 2010 13th International IEEE Annual Conference on Intelligent Transportation Systems, Madeira Island, Portugal, Sep. 19-22, 2010, pp. 1691-1696, 978-1-4244-7659-6/10, © 2010 IEEE.

Wang et al., "A Design Method for Building a Multi-scale Navigation Electronic Map", Key Lab of 3D Information Acquisition and Application, Ministry of Education, Capital Normal University, Beijing 100037, China, pp. 4643-4647, 1-4244-1212-9/07, © 2007 IEEE.

Kalyanaraman et al., "Linear Projection-Based Navigation", U.S. Appl. No. 14/674,415, filed Mar. 31, 2015, 33 pages.

IBM Appendix P, list of patents or patent applications treated as related, Jan. 16, 2017, 2 pages.

* cited by examiner

LINEAR PROJECTION-BASED NAVIGATION

BACKGROUND OF THE INVENTION

The present invention relates generally to navigation systems, and more particularly to linear projection-based navigation.

Global positioning systems (GPS) and navigation systems that use GPS are becoming increasingly widespread. For example, navigation systems are often installed in automobiles and are incorporated into handheld devices such as smartphones and tablet computers. Navigation systems can provide users with visual and aural information, including maps, turn-by-turn directions, and alerts.

SUMMARY

Embodiments of the present invention provide systems, methods, and program products for generating a linear projection of a route. In one embodiment, a method for generating a linear projection of a route, the method comprising: receiving, by one or more computer processors, route information for a planned route; parsing, by one or more computer processors, the route information into a starting point, a destination, and one or more turns; generating, by one or more computer processors, a linear route comprising a center line and one or more segments extending from the center line, wherein a first end of the center line represents the starting point, a second end of the center line represents the destination, and each of the one or more segments represents a planned turn or a street that will be passed when traveling along the planned route; providing, by one or more computer processors, the linear route to a user; and providing accesibility functions to the user based on a profile associated with the user and the route information, comprising: activating turn signals when approaching turns identified in the route information; and activating lights based on the route information.

DETAILED DESCRIPTION

Embodiments of the present invention recognize that routes and other information displayed by navigational systems can be difficult for users to digest and act upon, particularly when users are traveling and other tasks require attention. For example, small screen sizes of handheld devices and automobile navigation systems can make fitting full routes on a display screen difficult. Routes and other pertinent information that is displayed (e.g., landmark data, places of interest, traffic data, warnings, etc.) can also crowd graphical user interfaces, making it difficult for users to interact with navigational systems.

Furthermore, while many navigational systems provide route information to users in the form of road names and/or numbers, embodiments of the present invention recognize that such navigational systems can be difficult to use where users are not familiar with the road names and/or numbers, and where road names and/or numbers are not clearly and consistently marked.

Embodiments of the present invention provide systems, methods, and computer program products for generating linear projections of routes. Embodiments of the present invention can parse route information and generate linear projections of routes that are more easily digested by users, even where small display screens are used. Furthermore, such linear projections of routes can better convey navigational information to users where those users may not be familiar with road names, may not be able to see road signs, and/or where roads are not marked with signage.

Figure 1:
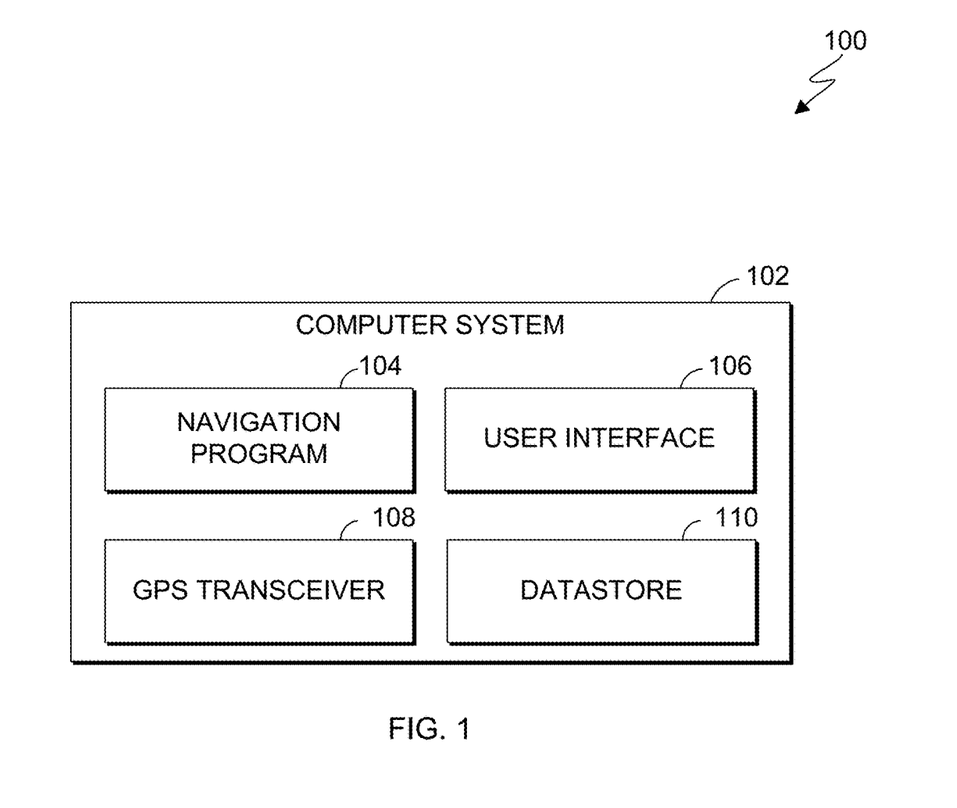
FIG. 1 is a block diagram of a computing environment, in accordance with an embodiment of the present invention.

FIG. 1 is a functional block diagram of computing environment 100, in accordance with an embodiment of the present invention. Computing environment 100 includes computer system 102. Computer system 102 can be a smartphone, tablet computer, laptop computer, specialized computer, or any other computer system known in the art. In general, computer system 102 is representative of any electronic device, or combination of electronic devices, capable of executing machine-readable program instructions, as described in greater detail with regard to FIG. 10.

Computer system 102 includes navigation program 104, user interface 106, global positioning system (GPS) transceiver 108, and data store 110. Navigation program 104 parses route information and generates linear projections of routes. In this embodiment, navigation program 104 uses GPS location data received from GPS transceiver 106 to generate routes and track the location of computer system 102 on such routes. Navigation program 104 can be implemented as one or more stand-alone programs or in conjunction with existing navigation software, such as map software.

User interface 106 is used by navigation program 104 to provide navigational information to a user of computer system 102. In this embodiment, user interface 106 can display linear projections of routes generated by navigation program 104, along with supplementary information such as locations of interest, landmarks, hazards, warnings, speed limits, icons, road signs, traffic data, and weather data. User interface 106 can also provide information to the user aurally, such as by announcing instructions and other information, and playing alert tones.

GPS transceiver 108 communications with GPS satellites to identify the location of computer system 102. GPS transceiver 108 can be implemented with any suitable GPS technology known in the art.

Data store 110 is used to store information such as user preferences and route information. Data store 110 can be implemented with any suitable storage medium and storage architecture known in the art.

Figure 2:
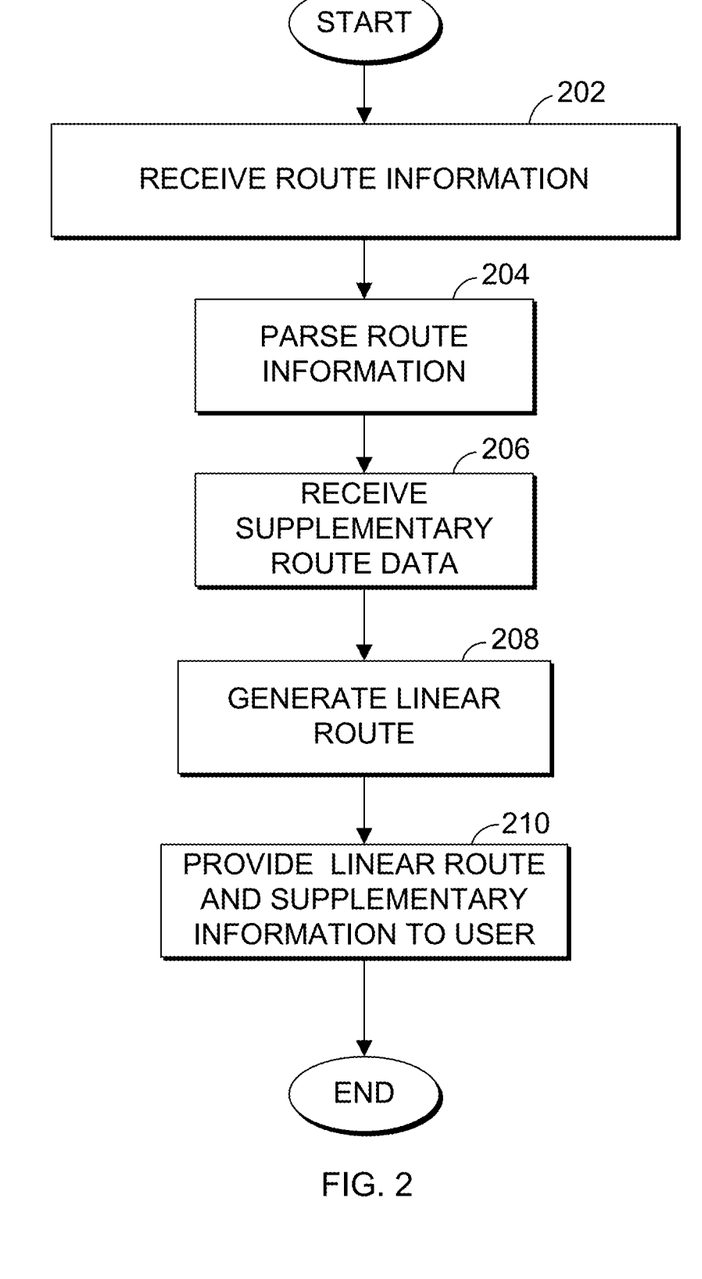
FIG. 2 is a flowchart illustrating operational steps for generating a linear route, in accordance with an embodiment of the present invention.

FIG. 2 is a flowchart 200 illustrating operational steps for generating a linear route, in accordance with an embodiment of the present invention.

In step 202, navigation program 104 receives route information. In this embodiment, navigation program 104 receives route information entered by a user. Navigation program 104 can also receive route information from one or more other programs, such as from mapping programs and web services.

In step 204, navigation program 104 parses the received route information. In this embodiment, navigation program 104 parses the received route information to identify the starting point of the route, the destination, planned left turns, streets that will be passed on the left of the route, planned right turns, and streets that will be passed on the right of the route.

In step 206, navigation program 104 receives supplementary route data. In this embodiment, supplementary data can include, for example, traffic data, weather data, warnings, landmarks, places of interest, and other data pertaining to one or more portions of the generated route.

In step 208, navigation program 104 generates a linear route using the parsed route data. In this embodiment, navigation program 104 plots a linear route comprising a central straight line beginning from the starting point of the route and extending to the destination (e.g., with the starting point oriented below the destination), and line segments (e.g., arrows) extending from the left and right sides of the central straight line representing left turns and right turns and left and right streets that will be passed, respectively. Line segments representing planned turns can be visually distinguished from line segments representing streets that will be passed along the planned route (e.g., as more heavily weighted lines). In this embodiment, navigation program 104 also displays supplementary route data on the generated route. For example, where supplementary route data indicates a traffic accident or a washed out road on a particular portion of the generated route, navigation program 104 can overlay an icon or other notification of such data on the appropriate portion of the central straight line associated with that particular portion of the generated route. Optionally, the straight line can be configured to be shown diagonally to the display for the purpose of covering more area.

In step 210, navigation program 104 uses user interface 106 to provide the generated linear route and supplementary information to a user of computer system 102. In this embodiment, user interface 106 displays the information on a display screen and can also play audio.

Figure 3:
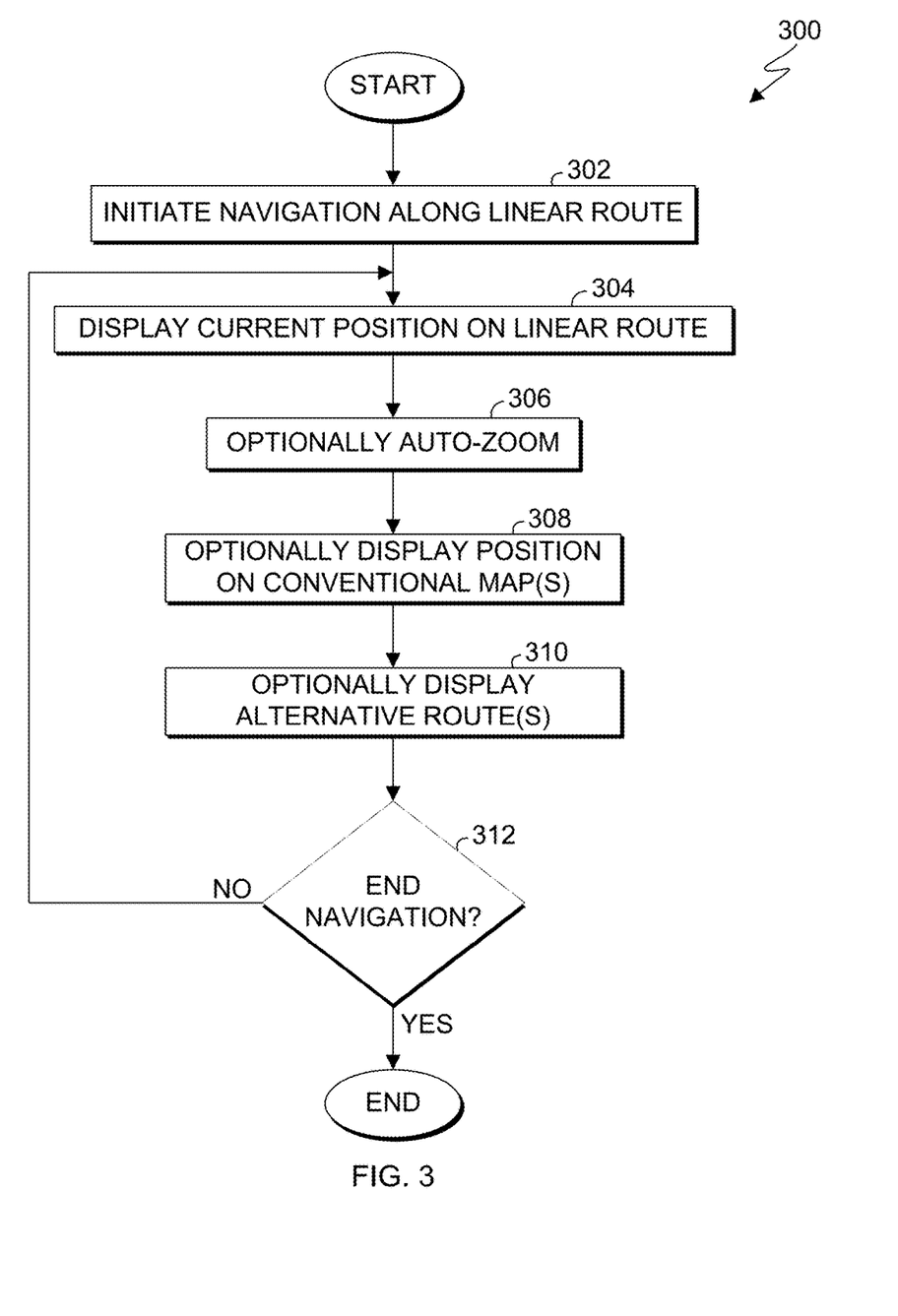
FIG. 3 is a flowchart illustrating operational steps for providing navigation information, in accordance with an embodiment.

FIG. 3 is a flowchart 300 illustrating operational steps for providing navigation information, in accordance with an embodiment.

In step 302, navigation program 104 initiates navigation along a generated linear route. For example, a linear route can be generated in accordance with the operational steps of flowchart 200. In this embodiment, navigation program 104 initiates navigation in response to a user issuing a command to initiate navigation and/or upon detecting via GPS transceiver 108 that computer system 102 has started moving.

In step 304, navigation program 104 and user interface 106 display the current position of computer system 102 on the generated linear route. In this embodiment, GPS transceiver 108 provides location information for computer system 102, and the location of computer system 102 is plotted on the generated linear route using an icon overlaid on the appropriate portion of the generated linear route. In this embodiment, as the user travels along the route, line segments representing turns the user has made and streets the user has passed, as well as supplementary route data for those portions of the route, are removed from the generated linear route, and additional line segments representing upcoming turns and streets that the user will pass are added the generated linear route, along with any additional supplementary route data for those added portions of the route.

In step 306, navigation program 104 optionally instructs user interface 106 to auto-zoom. In this embodiment, navigation program 104 can instruct user interface 106 to auto-zoom in response to various conditions, such that information on user interface 106 is displayed in a larger, more focused manner. For example, in response to GPS transceiver 108 determining that computer system 102 has started to slow down (e.g., in preparation for a turn or arrival at a place of interest), navigation program 104 can issue a command to user interface 106 to enlarge the portion of the generated linear route at which computer system 102 is currently located. In another example, navigation program 104 can issue a command to user interface 106 to enlarge portions of the generated linear route such that each line segment is at least a minimum specified size or has a minimum spacing from other line segments (e.g., in pixels, percent screen size, etc.). In other embodiments, navigation program 104 can issue a command to user interface 106 to enlarge portions of the generated linear route in response to detecting other conditions, such as a user selection, an indication that the user is lost, and an indication of traffic congestion (e.g., increased numbers of vehicles and/or increased density of traffic lanes).

In step 308, navigation program 104 optionally instructs user interface 106 to display the current position of computer system 102 on one or more conventional maps or photographic views of the street. For example, a user may wish to view his or her current location on a conventional map generated by mapping software. The user can select a button, causing navigation program 104 to issue an instruction to user interface 106 to display the current position on that conventional map instead of, or in addition to, the generated linear route.

In step 312, navigation program 104 determines whether navigation should be ended. In this embodiment, navigation program 104 continues navigation until a user enters an end navigation command, or the destination is reached. If, in step 312, navigation program 104 determines that navigation should not be ended, then the operational steps repeat at step 204, where navigation program 104 and user interface 106 display the current (i.e., updated) position of computer system 102 on the generated linear route.

If, in step 312, navigation program 104 determines that navigation should be ended, then the operational steps of flowchart 300 end.

Figure 4A:
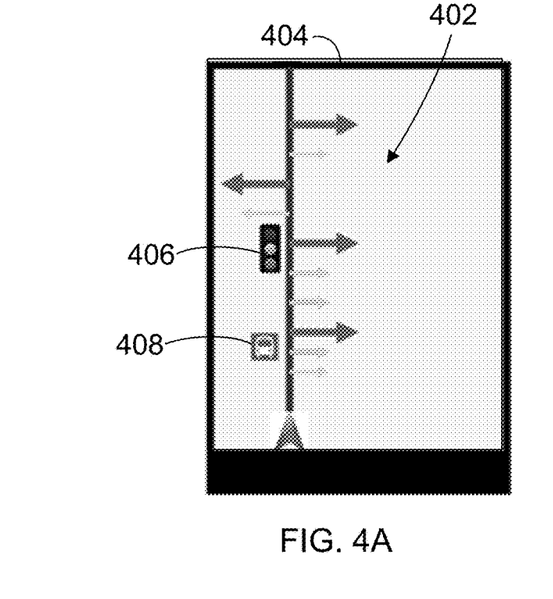
FIGS. 4A and 4B depict an example linear route and conventional route, in accordance with an embodiment of the present invention.
Figure 4B:
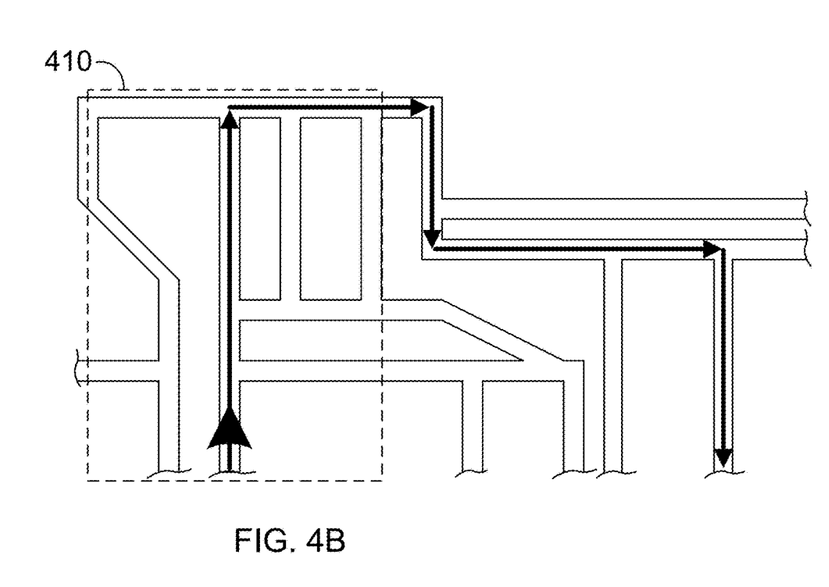

FIGS. 4A and 4B depict an example linear route and conventional route, respectively, in accordance with an embodiment of the present invention. As shown in FIG. 4B, given the current location of the user (e.g., the larger arrow head), and following the route illustrated by arrows, the conventional route comprises the following elements in the following order (from starting point to destination): a street on the right side, a street on the right side, a planned right turn, a street on the right side, a street on the right side, a planned right turn, a street on the left, a planned left turn, a street on the right side, and a planned right turn. FIG. 4A depicts the same route displayed as linear route 402 on display screen 404. In the linear route, the starting point is represented by the bottom end of the central straight line, and the destination is represented by the opposing, top end of the central straight line. Planned turns are represented by larger, darker arrows extending from the left (i.e., for planned left turns) and right (i.e., for planned right turns) of the central straight line. Streets on the left and right sides that will be passed along the planned route are represented by smaller, lighter arrows extending from the left (i.e., for streets on the left) and right (i.e., for streets on the right) of the central straight line. As shown, arrows representing planned turns and streets on the left or right are placed in the order in which those turns or streets will be made or passed, respectively, as the user travels along the planned route. In addition, supplementary route data is displayed in the form of bus stop icon 408 and traffic light icon 406 beside two planned right turns, indicating that there is a bus stop and traffic light at those respective intersections.

FIG. 4B also includes dashed box 410 representing the size of display screen 404 shown in FIG. 4A. As can be seen, given the same screen size and/or available screen real estate, linear route 402 is able to display more information (including the complete route) to a user in a clean and easily digestible manner.

Figure 5:
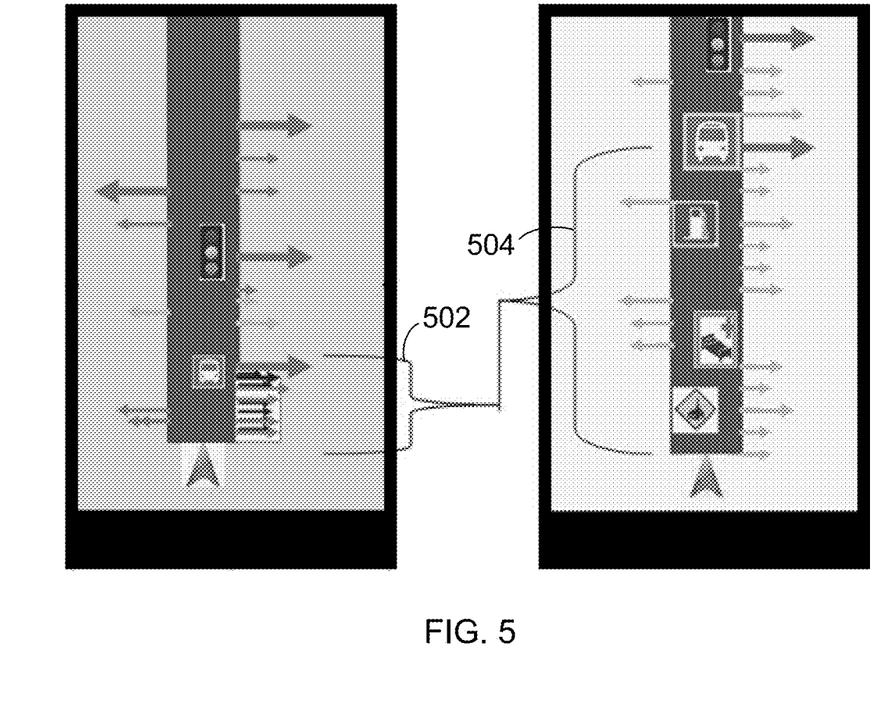
FIG. 5 depicts auto-zooming a portion of an example linear route, in accordance with an embodiment of the present invention.

FIG. 5 depicts auto-zooming a portion of an example linear route, in accordance with an embodiment of the present invention. As shown, portion 502 of a linear route is expanded and displayed as expanded portion 504, such that possible turns and other features of the route possess a minimum specified size and spacing. In this embodiment, a user can specify minimum sizes and spacing for routes and other features generated by navigation program 104 in terms of pixels, percentage of screen size, or any other suitable measure.

Figure 6:
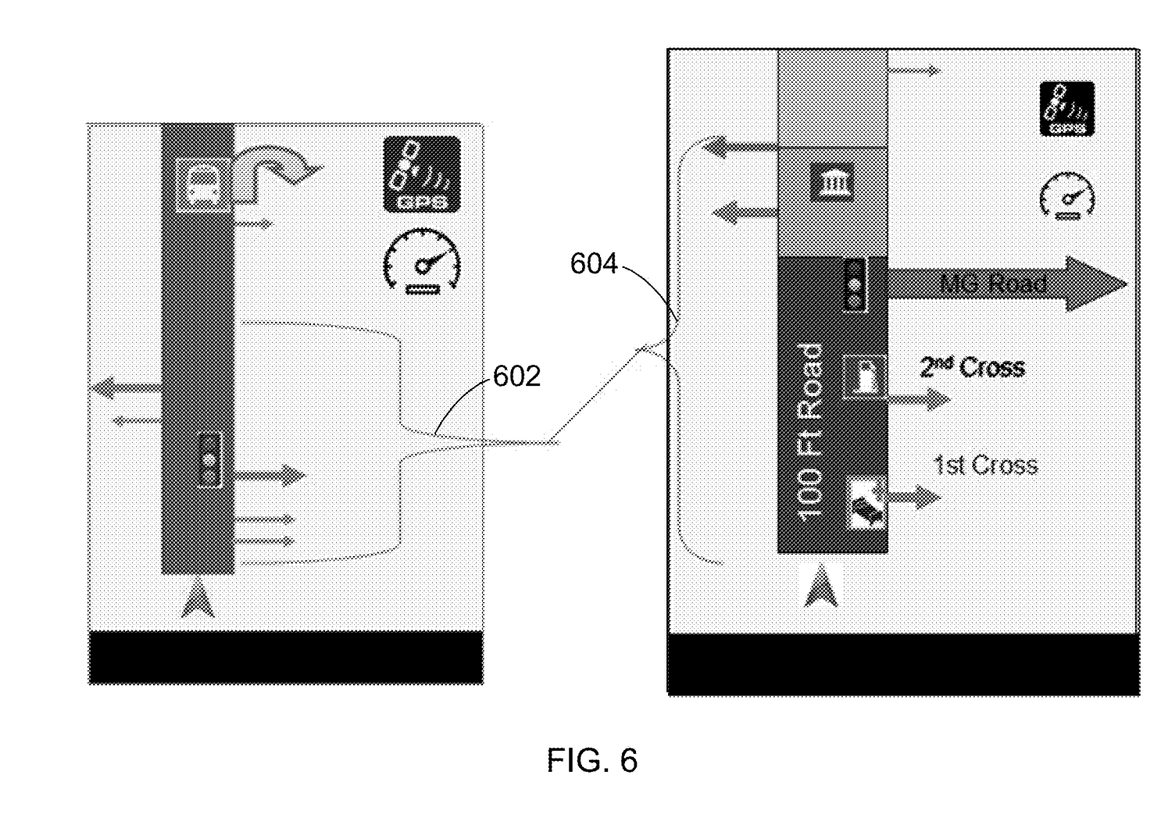
FIG. 6 depicts auto-zooming a portion of an example linear route, in accordance with another embodiment of the present invention.

FIG. 6 depicts auto-zooming a portion of an example linear route, in accordance with another embodiment of the present invention. In this embodiment, portion 602 of a linear route is expanded to display expanded portion 604 upon GPS transceiver 108 detecting that computer system 102 (i.e., and the user operating computer system 102) has slowed down to a specified speed. For example, computer system 102 may slow down when the user operating computer system 102 is approaching a turn or destination, is looking about for something of interest, or is lost. In each of these scenarios, the user may benefit from an expanded view of the linear route to more easily glean important information at a time when other things require the user's attention. FIG. 6 also depicts how expanded portion 604 can be used to display additional information to the user, such as icons indicating places of interest (e.g., a bank, gas station, and hospital) and names of roads for turns that the user should make and names of roads the user will pass.

Figure 7:
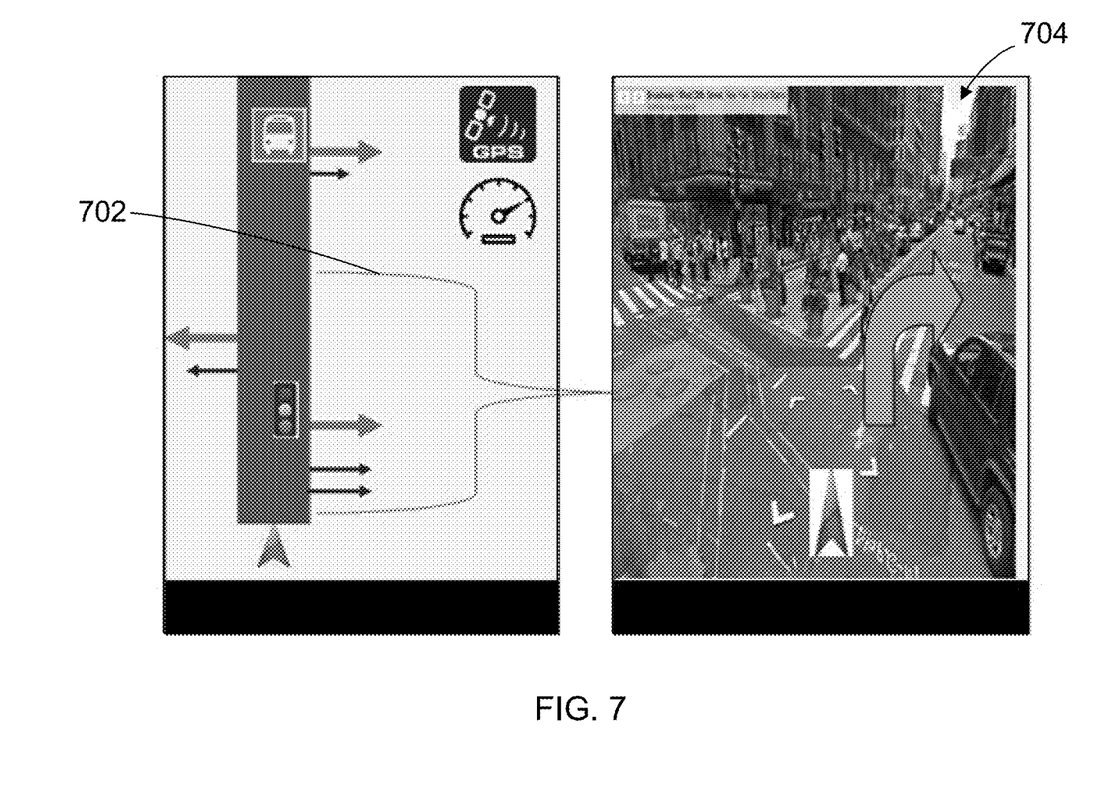
FIG. 7 depicts display of a portion of an example linear route in an additional format, in accordance with an embodiment of the present invention.

FIG. 7 depicts display of a portion of an example linear route in an additional format, in accordance with an embodiment of the present invention. In this embodiment, portion 702 of a linear route is displayed in additional format 704 (i.e., a photographic view of the street) upon GPS transceiver 108 detecting that computer system 102 (i.e., and the user operating computer system 102) has slowed down to a specified speed.

Figure 8:
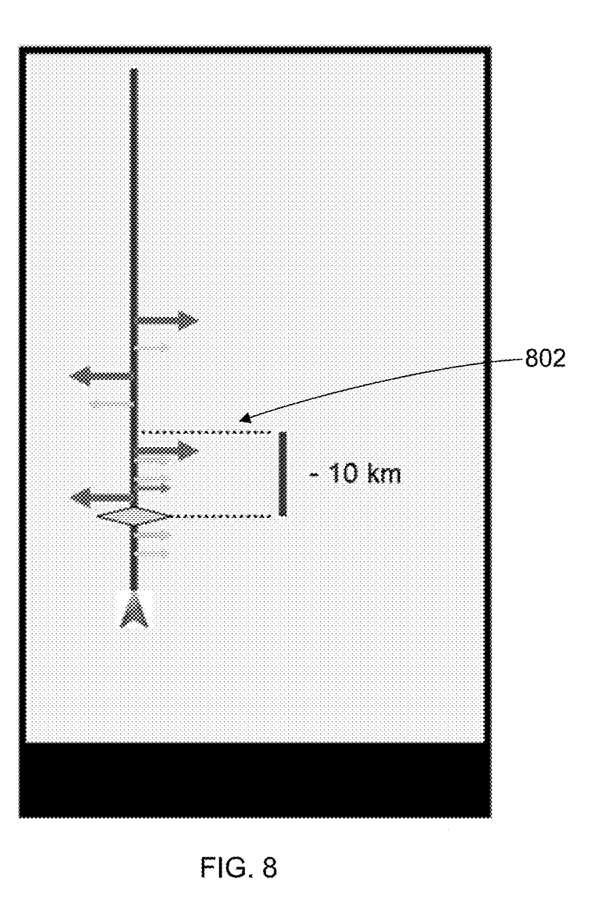
FIG. 8 depicts display of an alternative route for a portion of an example linear route, in accordance with an embodiment of the present invention.

FIG. 8 depicts display of an alternative route for a portion of an example linear route, in accordance with an embodiment of the present invention. In this embodiment, an indication is provided to the user that alternative route exists for portion 802 of the linear route, and the alternative route is 10 km shorter.

FIGS. 9A through 9D depict selection of an alternative route for a portion of an example linear route, in accordance with an embodiment of the present invention. In this embodiment, route constraints are provided to the user based on dynamic data. An alert is displayed, allowing the user to select the alert to zoom the route to the particular affected area. Automatic zooming can also be configured for specified areas, types of alerts, etc. For example, weather data like flooding, or GPS data showing vehicles ahead on the same route are slowing down, can trigger an alert to be sounded and the particular affected area of the route to be zoomed in showing appropriate icons. The user can, for example, ignore the alerts or modify the route to avoid the affected areas.

Figure 9A:
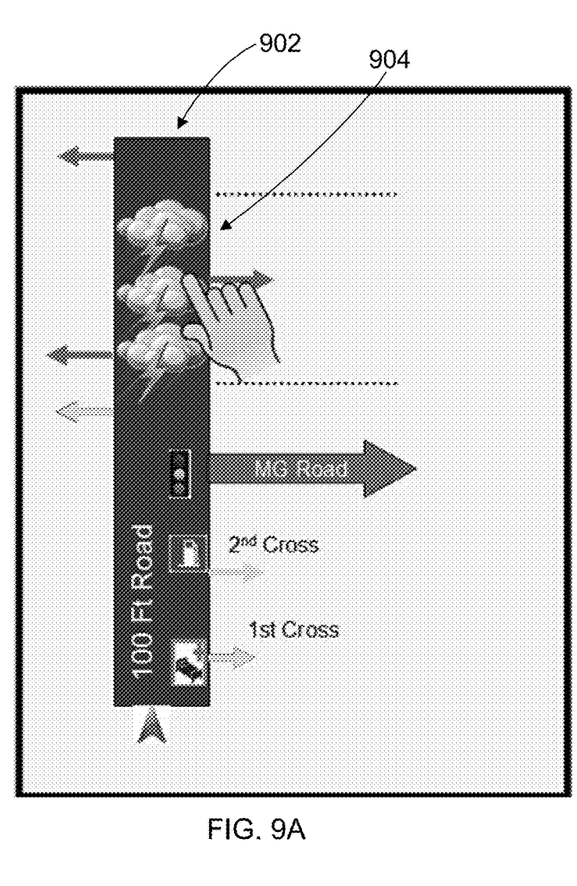
FIGS. 9A through 9D depict selection of an alternative route for a portion of an example linear route, in accordance with an embodiment of the present invention.
Figure 9B:
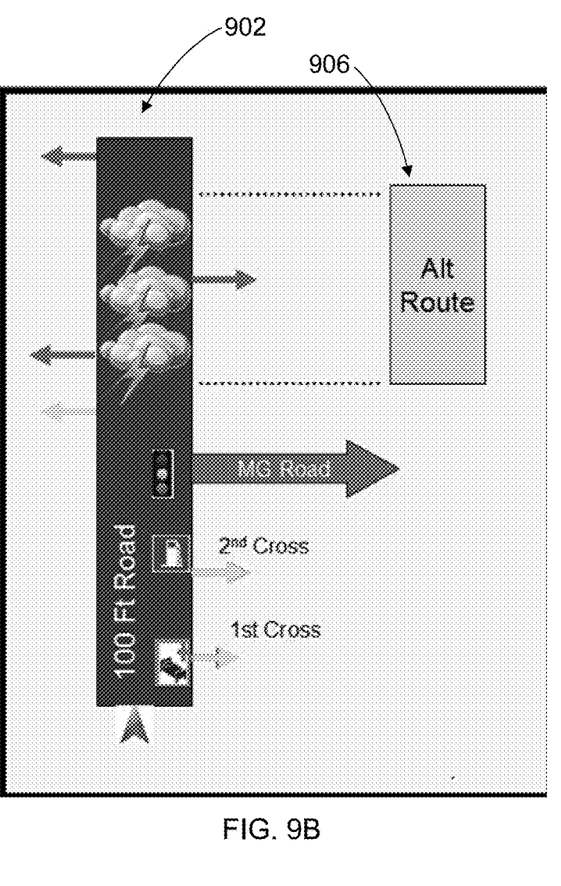
Figure 9C:
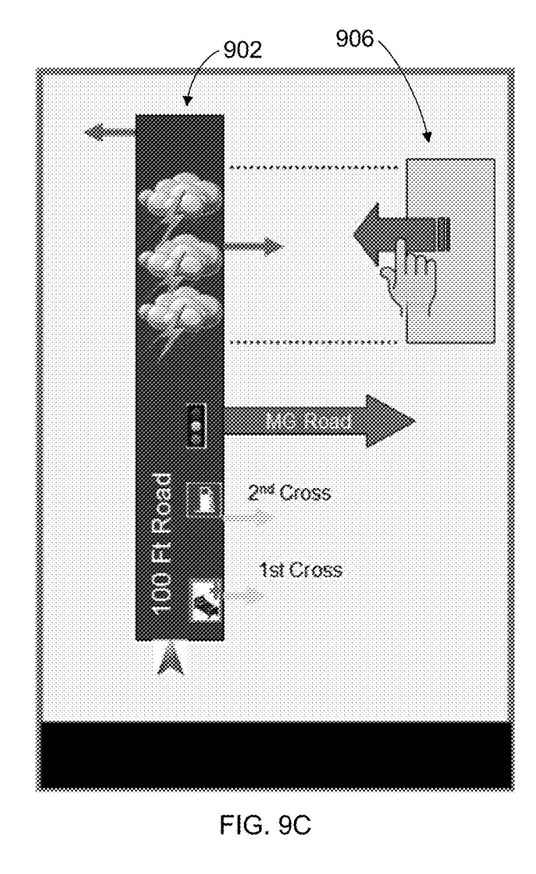
Figure 9D:
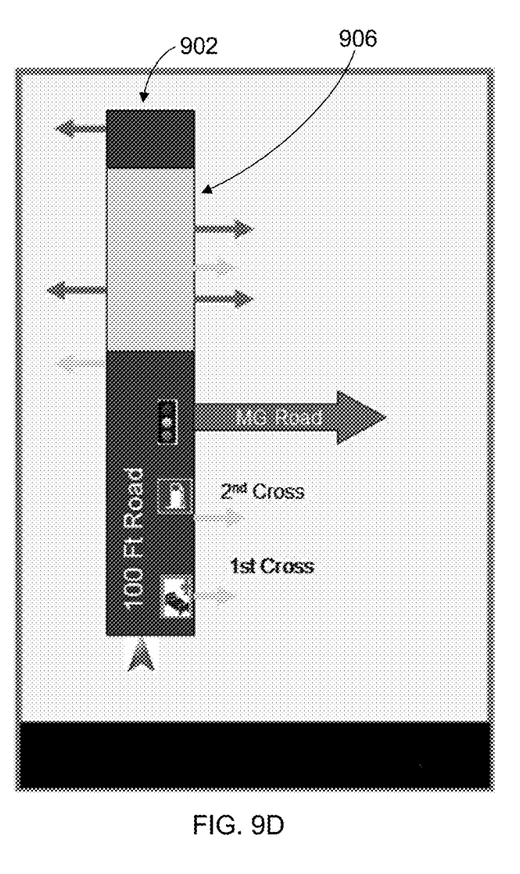

As shown in FIG. 9A, weather information 904 is displayed over an associated portion of generated linear route 902, which can be selected by a user (e.g., point and click, or with a touch screen). As shown in FIG. 9B, alternative route 906 can be generated for the selected portion of the route. For example, alternative route 906 may be one which avoids inclement weather. As shown in FIGS. 9C and 9D, alternative route 906 can be selected by the user and placed into the generated linear route (e.g., by dragging and dropping or sliding with a single finger). In this manner, the user can readily drag and drop alternative routes for one or more portions of a linear route.

In another embodiment, navigation program 104 can provide additional accessibility functions based on individual drivers and route data. For example, a user profile can be configured for a particular driver such that when approaching turns, turn signals are ensured to be activated. In another example, headlights can be turned on and off when navigation program 104 detects that the driver is entering and exiting a tunnel, respectively.

Figure 10:
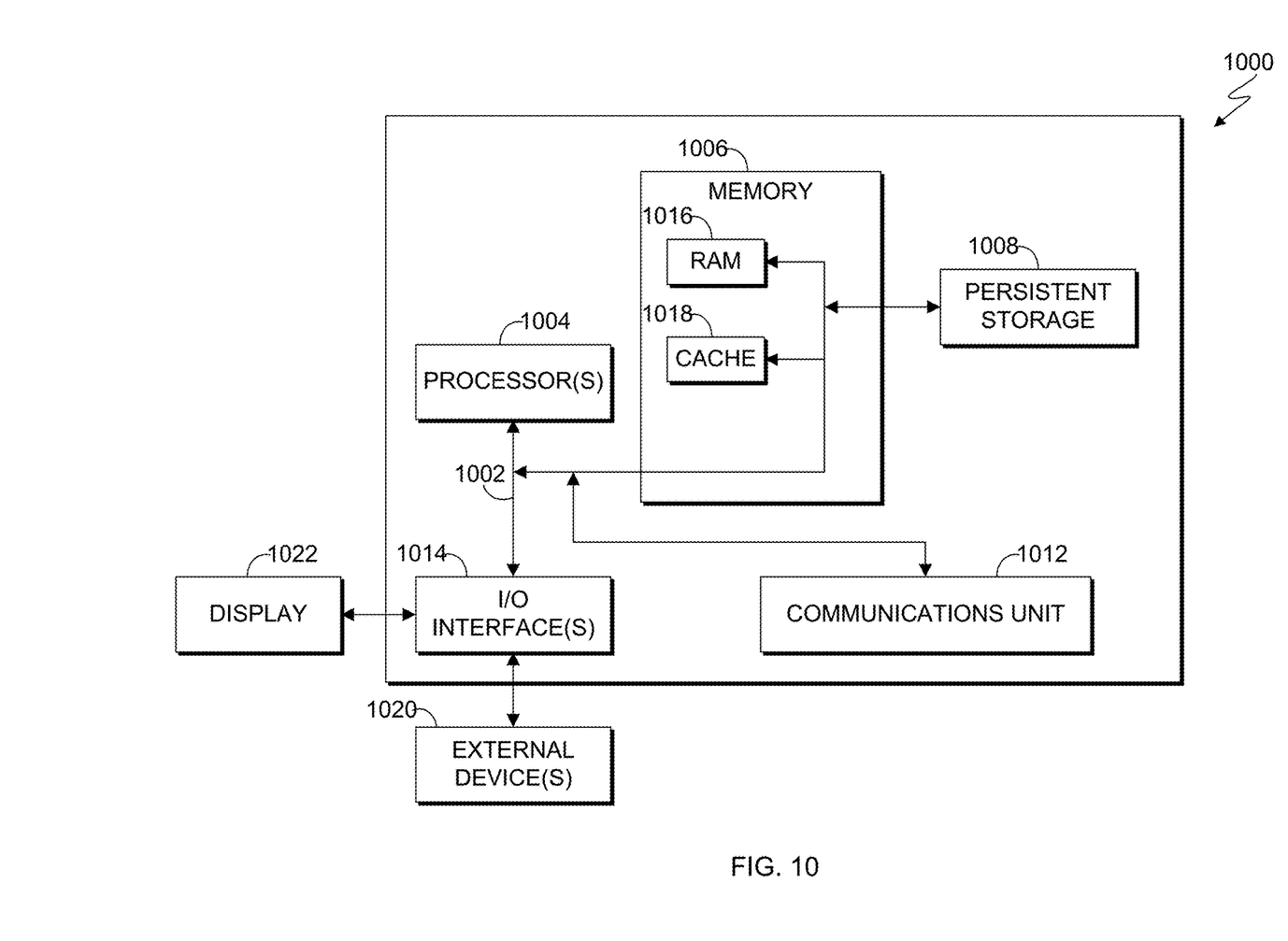
FIG. 10 is a block diagram of internal and external components of the computer system of FIG. 1, in accordance with an embodiment of the present invention.

FIG. 10 is a block diagram of internal and external components of a computer system 1000, which is representative the computer system of FIG. 1, in accordance with an embodiment of the present invention. It should be appreciated that FIG. 10 provides only an illustration of one implementation and does not imply any limitations with regard to the environments in which different embodiments may be implemented. In general, the components illustrated in FIG. 10 are representative of any electronic device capable of executing machine-readable program instructions. Examples of computer systems, environments, and/or configurations that may be represented by the components illustrated in FIG. 10 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 1000 includes communications fabric 1002, which provides for communications between one or more processors 1004, memory 1006, persistent storage 1008, communications unit 1012, and one or more input/output (I/O) interfaces 1014. Communications fabric 1002 can be implemented with any architecture designed for passing data and/or control information between processors (such as microprocessors, communications and network processors, etc.), system memory, peripheral devices, and any other hardware components within a system. For example, communications fabric 1002 can be implemented with one or more buses.

Memory 1006 and persistent storage 1008 are computer-readable storage media. In this embodiment, memory 1006 includes random access memory (RAM) 1016 and cache memory 1018. In general, memory 1006 can include any suitable volatile or non-volatile computer-readable storage media. Software is stored in persistent storage 1008 for execution and/or access by one or more of the respective processors 1004 via one or more memories of memory 1006.

Persistent storage 1008 may include, for example, a plurality of magnetic hard disk drives. Alternatively, or in addition to magnetic hard disk drives, persistent storage 1008 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 1008 can also be removable. For example, a removable hard drive can be used for persistent storage 1008. Other examples include optical and magnetic disks, thumb drives, and smart cards that are inserted into a drive for transfer onto another computer-readable storage medium that is also part of persistent storage 1008.

Communications unit 1012 provides for communications with other computer systems or devices via a network. In this exemplary embodiment, communications unit 1012 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 1012 (e.g., via the Internet, a local area network or other wide area network). From communications unit 1012, the software and data can be loaded onto persistent storage 1008.

One or more I/O interfaces 1014 allow for input and output of data with other devices that may be connected to computer system 1000. For example, I/O interface 1014 can provide a connection to one or more external devices 1020 such as a keyboard, computer mouse, touch screen, virtual keyboard, touch pad, pointing device, or other human interface devices. External devices 1020 can also include portable computer-readable storage media such as, for example, thumb drives, portable optical or magnetic disks, and memory cards. I/O interface 1014 also connects to display 1022.

Display 1022 provides a mechanism to display data to a user and can be, for example, a computer monitor. Display 1022 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating a linear projection of a route, the method comprising:

receiving, by one or more computer processors, route information for a planned route;

parsing, by one or more computer processors, the route information into a starting point, a destination, and one or more turns;

generating, by one or more computer processors, a linear route comprising a center line and one or more segments extending from the center line, wherein a first end of the center line represents the starting point, a second end of the center line represents the destination, and each of the one or more segments represents a planned turn or a street that will be passed when traveling along the planned route;

providing, by one or more computer processors, the linear route to a user; and providing accesibility functions to the user based on a profile associated with the user and the route information, comprising:

activating turn signals when approaching turns identified in the route information; and activating lights based on the route information.

2. The method of claim 1, further comprising:

receiving, by one or more computer processors, supplementary route data comprising one or more of: weather data, traffic data, and alerts; and providing, by one or more computer processors, the supplementary route data to the user in conjunction with the linear route.

3. The method of claim 2, wherein providing, by one or more computer processors, the supplementary route data to the user in conjunction with the linear route, comprises:

displaying, by one or more computer processors, the supplementary route data to the user in conjunction with the linear route.

4. The method of claim 2, wherein providing, by one or more computer processors, the supplementary route data to the user in conjunction with the linear route, comprises:

aurally providing, by one or more computer processors, the supplementary route data to the user while displaying the linear route to the user.

5. The method of claim 1, wherein segments that represent a planned right turn or a street that will be passed on a right side when traveling along the planned route extend in a rightward direction from the center line, and segments that represent a planned left turn or a street that will be passed on a left side when traveling along the planned route extend in a leftward direction from the center line.

6. The method of claim 5, wherein segments that represent a planned right turn or a planned left turn are visually distinguished in one or more of size, shape, or color from segments that represent a street that will be passed on the left side or a street that will be passed on the right side.

7. The method of claim 1, further comprising:

providing, by one or more computer processors, a modified view of the linear route to the user in response to detecting one or more of: the user slowing travel along the generated route, an indication that the user is lost, an indication of traffic congestion, and a user selection.

8. The method of claim 7, wherein the modified view includes one or more of: a photographic view of a street, a map, and one or more portions of an alternative linear route.

9. A computer program product for generating a linear projection of a route, comprising one or more computer readable storage media and program instructions stored on the one or more computer readable storage media, the program instructions comprising:

program instructions to receive route information for a planned route;

program instructions to parse the route information into a starting point, a destination, and one or more turns;

program instructions to generate a linear route comprising a center line and one or more segments extending from the center line, wherein a first end of the center line represents the starting point, a second end of the center line represents the destination, and each of the one or more segments represents a planned turn or a street that will be passed when traveling along the planned route;

program instructions to provide the linear route to a user; and program instructions to provide accesibility functions to the user based on a profile associated with the user and the route information, comprising:

activating turn signals when approaching turns identified in the route information; and activating lights based on the route information.

10. The computer program product of claim 9, wherein the program instructions stored on the one or more computer readable storage media further comprise:

program instructions to receive supplementary route data comprising one or more of:

weather data, traffic data, and alerts; and program instructions to provide the supplementary route data to the user in conjunction with the linear route.

11. The computer program product of claim 10, wherein the program instructions to provide the supplementary route data to the user in conjunction with the linear route comprise:

program instructions to display the supplementary route data to the user in conjunction with the linear route.

12. The computer program product of claim 10, wherein the program instructions to provide the supplementary route data to the user in conjunction with the linear route comprise:

program instructions to aurally provide the supplementary route data to the user while displaying the linear route to the user.

13. The computer program product of claim 9, wherein segments that represent a planned right turn or a street that will be passed on a right side when traveling along the planned route extend in a rightward direction from the center line, and segments that represent a planned left turn or a street that will be passed on a left side when traveling along the planned route extend in a leftward direction from the center line.

14. The computer program product of claim 13, wherein segments that represent a planned right turn or a planned left turn are visually distinguished in one or more of size, shape, or color from segments that represent a street that will be passed on the left side or a street that will be passed on the right side.

15. The computer program product of claim 9, wherein the program instructions stored on the one or more computer readable storage media further comprise:

program instructions to provide a modified view of the linear route to the user in response to detecting one or more of: the user slowing travel along the generated route, an indication that the user is lost, an indication of traffic congestion, and a user selection.

16. A computer system for generating a linear projection of a route, comprising:

one or more computer processors;

one or more computer readable storage media; and program instructions stored on the one or more computer readable storage media for execution by at least one of the one or more processors, the program instructions comprising:

program instructions to receive route information for a planned route;

program instructions to parse the route information into a starting point, a destination, and one or more turns;

program instructions to generate a linear route comprising a center line and one or more segments extending from the center line, wherein a first end of the center line represents the starting point, a second end of the center line represents the destination, and each of the one or more segments represents a planned turn or a street that will be passed when traveling along the planned route; and program instructions to provide the linear route to a user; and program instructions to provide accesibility functions to the user based on a profile associated with the user and the route information, comprising:

activating turn signals when approaching turns identified in the route information; and activating lights based on the route information.

17. The computer system of claim 16, wherein the program instructions stored on the one or more computer readable storage media further comprise:

program instructions to receive supplementary route data comprising one or more of: weather data, traffic data, and alerts; and program instructions to provide the supplementary route data to the user in conjunction with the linear route.

18. The computer system of claim 17, wherein the program instructions to provide the supplementary route data to the user in conjunction with the linear route comprise:

program instructions to display the supplementary route data to the user in conjunction with the linear route.

19. The computer system of claim 16, wherein segments that represent a planned right turn or a street that will be passed on a right side when traveling along the planned route extend in a rightward direction from the center line, and segments that represent a planned left turn or a street that will be passed on a left side when traveling along the planned route extend in a leftward direction from the center line.

20. The computer system of claim 19, wherein segments that represent a planned right turn or a planned left turn are visually distinguished in one or more of size, shape, or color from segments that represent a street that will be passed on the left side or a street that will be passed on the right side.

* * * * *